United States Patent
Meyers et al.

(10) Patent No.: US 11,807,759 B2
(45) Date of Patent: Nov. 7, 2023

(54) EMULSION COMPOSITIONS FOR PRIMING A PAVEMENT SURFACE

(71) Applicant: Ecolab USA Inc., St. Paul, MN (US)

(72) Inventors: Adam Meyers, Waxahachie, TX (US); Glenda Vale, Corsicana, TX (US); Chenthamarakshan Nair, Corsicana, TX (US); Vyacheslav Boyarskikh, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 425 days.

(21) Appl. No.: 17/015,455

(22) Filed: Sep. 9, 2020

(65) Prior Publication Data

US 2021/0071002 A1 Mar. 11, 2021

Related U.S. Application Data

(60) Provisional application No. 62/897,670, filed on Sep. 9, 2019.

(51) Int. Cl.
| | |
|---|---|
| *C08L 95/00* | (2006.01) |
| *C08K 3/013* | (2018.01) |
| *C08K 3/22* | (2006.01) |
| *C08K 5/42* | (2006.01) |
| *C08L 77/00* | (2006.01) |
| *C09D 195/00* | (2006.01) |
| *C09D 177/00* | (2006.01) |

(52) U.S. Cl.
CPC ............ *C08L 95/005* (2013.01); *C08K 3/013* (2018.01); *C08K 3/22* (2013.01); *C08K 5/42* (2013.01); *C08L 77/00* (2013.01); *C09D 177/00* (2013.01); *C09D 195/005* (2013.01)

(58) Field of Classification Search
None
See application file for complete search history.

(56) References Cited

U.S. PATENT DOCUMENTS

| | | |
|---|---|---|
| 3,216,336 A | 11/1965 | Benson |
| 3,230,104 A | 1/1966 | Falkenberg et al. |
| 3,304,191 A | 2/1967 | Barrett |
| 4,362,568 A | 12/1982 | Ostermeyer |
| 4,478,642 A | 10/1984 | Schilling et al. |
| 4,547,224 A | 10/1985 | Schilling |
| 5,224,990 A | 7/1993 | Vicenzi et al. |
| 5,296,264 A | 3/1994 | Blacklidge et al. |
| 5,503,871 A | 4/1996 | Blacklidge et al. |
| 5,668,197 A | 9/1997 | Schilling |
| 5,776,234 A | 7/1998 | Schilling |
| 6,764,542 B1 | 7/2004 | Lackey et al. |
| 8,133,408 B2 | 3/2012 | Swift et al. |
| 9,493,633 B2 | 11/2016 | Rowland et al. |
| 2008/0127858 A1* | 6/2008 | Thorstensson ........... C08K 5/17 564/512 |
| 2012/0167802 A1 | 7/2012 | Huh |
| 2017/0204268 A1 | 7/2017 | Delfosse et al. |

FOREIGN PATENT DOCUMENTS

| | | |
|---|---|---|
| EP | 2907853 A1 | 8/2015 |
| FR | 3020065 A1 | 10/2015 |
| MX | 2012004001 A | 7/2012 |
| WO | 00/68329 | 11/2000 |
| WO | 2018/055262 A1 | 3/2018 |

* cited by examiner

*Primary Examiner* — Colin W. Slifka
(74) *Attorney, Agent, or Firm* — Stinson LLP

(57) ABSTRACT

Aqueous base- or acid-stabilized emulsions are provided for use on a pavement surface, and for use in an aqueous priming base emulsion that is used for priming a pavement surface. Any of the emulsions can be applied to a pavement surface to form a primed pavement surface, and then cured so that the pavement is available for use in preparing a pavement.

15 Claims, No Drawings

EMULSION COMPOSITIONS FOR PRIMING A PAVEMENT SURFACE

CROSS REFERENCE TO RELATED APPLICATIONS

This application claims priority to U.S. Provisional Patent Application Ser. No. 62/897,670 filed on Sep. 9, 2019, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Compositions and methods for treating pavement surfaces are provided. More specifically, the compositions and methods are used to prime a base surface prior to application of an asphalt pavement.

BACKGROUND OF THE INVENTION

The construction of a roadway typically includes a base course of material which receives and supports one or more layers of pavement material. A base course may be composed of materials such as soil, clay, sand, or pulverized shell, and may be stabilized with cement or lime fly ash. The pavement materials applied to the base course to complete the roadway may include one or more layers of hot-mix asphalt, asphalt cement and aggregate, or concrete. Before the pavement is applied to the base course, the surface of the base course is typically sealed and primed. The sealant helps maintain sufficient moisture content of the base course to keep the course in a compacted and stable condition. If this moisture content is not maintained within acceptable limits, the base course may deteriorate over time requiring repair.

If an asphaltic pavement is applied, the base course must be primed with a suitable material to encourage the fusion or fluxing of the pavement material with the surface of the base course. A prime coat or priming base is a material designed to penetrate, bond and stabilize the existing base course and to promote adhesion between the existing base and a construction course, such as a new surface to be applied. If no new construction course is to be applied on top of the priming base layer, then it acts as a dust palliative. Insufficient adhesion between the base course and roadway pavement material can lead to pavement separation and cracking during installation, or subsequent failures such as premature deterioration of the pavement surface.

Cutback asphalts are the current standard for priming of roadway base courses in the asphalt road building industry. Cutback asphalts typically include asphalt residues in excess of 60% by weight of the total product combined with hydrocarbon solvents to maintain the asphalt in a liquid, flowable condition. The disadvantages of cutbacks include the amount of air pollution created and the cost associated with solvent loss. Highly stable oil-in-water asphalt emulsions have been used to replace cutback asphalts when applied with a co-solvent. Cutbacks and oil-in-water emulsions applied with a co-solvent as used to date may include volatile organic compounds (VOCs) that are considered harmful to the environment, may not sufficiently penetrate difficult bases, substrates or aggregates, and may not repel moisture enough to avoid structural failure of the pavement.

A VOC is any organic compound having an initial boiling point less than or equal to 250° C. measured at a standard atmospheric pressure of 101.3 kPa. The higher the volatility (lower the boiling point), the more likely the compound will be emitted from a product or surface into the air. In the United States, emissions of VOCs outdoors are regulated by the Environmental Protection Agency mostly to prevent the formation of ozone.

BRIEF SUMMARY OF THE INVENTION

One aspect of the invention is directed to an aqueous base-stabilized emulsion for use in a priming base material. The aqueous emulsion comprises a polyamide; an anionic emulsifier; a solvent; and a base. The polyamide comprises a condensation reaction product of an amine and a carboxylic acid or ester or anhydride thereof or an acyl halide.

A second aspect of the invention is directed to an aqueous acid-stabilized emulsion for use in a priming base material. The aqueous acid-stabilized emulsion can comprise a polyamide; a solvent; a cationic emulsifier; and an acid. The polyamide comprises a condensation reaction product of an amine and a carboxylic acid or ester or anhydride thereof or an acyl halide.

A third aspect of the invention is directed to an aqueous priming base emulsion for use on a pavement surface. The aqueous priming base emulsion can comprise asphalt and either of the aqueous base-stabilized emulsion or the aqueous acid-stabilized emulsion.

A fourth aspect of the invention is a method of priming a pavement surface. The method can comprise applying the aqueous base-stabilized emulsion, the aqueous acid-stabilized emulsion, or the aqueous priming base emulsion to a pavement surface to form a primed pavement surface; and curing the primed pavement surface.

Other objects and features will be in part apparent and in part pointed out hereinafter.

BRIEF DESCRIPTION OF THE SEVERAL VIEWS OF THE DRAWING

Not applicable.

DETAILED DESCRIPTION OF THE INVENTION

It has been discovered that oil-in-water emulsions of non-asphalt materials which exhibit tackifying behavior, such as certain polyamides, can perform as penetrating primers for road sub-surfaces such as a pavement. The emulsions provide several advantages over existing priming bases. The emulsions of the invention include minimal or no volatile organic compounds (VOC) and are therefore environmentally friendly. The emulsions of the invention provide sufficient penetration of the surface to which it is applied, even if that surface is a difficult base, substrate or aggregate (e.g., caliche). The emulsions of the invention, when cured, provide a hydrophobic coating on the pavement surface as it is primed (prepared) for road construction so that any moisture will be repelled. The emulsions can be formulated to include less than 2 wt. % VOCs such as heavy aromatic naphtha.

One aspect of the invention is directed to an aqueous base-stabilized emulsion for use in a priming base material. The aqueous emulsion comprises a polyamide; an anionic emulsifier; a solvent; and a base. The polyamide comprises a condensation reaction product of an amine and a carboxylic acid or ester or anhydride thereof or an acyl halide.

The amine for the condensation polymerization reaction can comprise a polyamine, an amino carboxylic acid, an amino alcohol, or any combination thereof.

The polyamine can comprise an aliphatic diamine, an aliphatic triamine, an aliphatic tetramine, an aliphatic polyamine, an aromatic diamine, an alicyclic diamine, a polyethyleneimine, or any combination thereof. For example, the polyamine can comprise from about 20 to 100 mol. % of the aliphatic diamine and 0 to about 20 mol. % of the aromatic diamine.

Examples of the polyamine include an aliphatic diamine, such as ethylenediamine, propylenediamine, butylenediamine, or hexamethylenediamine; an aliphatic triamine, such as diethylenetriamine; an aliphatic tetramine, such as triethylenetetramine; an aliphatic polyamine, such as tetraethylene pentamine, or pentaethylene hexamine; an aromatic diamine, such as xylenediamine, diaminodiphenyl ether, diaminodiphenyl sulfone, methylenebischloroaniline, para-phenylenediamine, or diphenylmethanediamine; an alicyclic diamine, such as piperazine, aminoethylpiperazine, or isophoronediamine; and a polyethyleneimine, such as an ethylenediamine-ethyleneimine polymer.

Examples of the amino carboxylic acid include methyl glycine, trimethyl glycine, 6-aminocaproic acid, δ-aminocaprylic acid, ε-caprolactam, or any combination thereof.

Examples of the amino alcohol include ethanolamine and propanolamine.

The amine used to form the polyamide of the aqueous base-stabilized emulsion can comprise, for example, a polyethyleneimine, diethylenetriamine, ethylenediamine, triethylenetetramine, tetraethylene pentamine, pentaethylene hexamine, aminoethylpiperazine, or any combination thereof. Preferably, the polyamine comprises the polyethyleneimine. For example, the polyethyleneimine can comprise an ethylenediamine-ethyleneimine polymer.

The polyethyleneimine can have an average molecular weight of from about 600 to about 100,000 daltons. For example, the polyethyleneimine has an average molecular weight of from about 600 to about 10,000 daltons, or from about 600 to about 2,000 daltons.

The carboxylic acid or ester or anhydride thereof used to form the polyamide of the aqueous base-stabilized emulsion can be a monocarboxylic acid or ester or anhydride thereof and/or a polycarboxylic acid or ester or anhydride thereof. For example, the carboxylic acid of the carboxylic acid or ester or anhydride thereof can comprise about 10 to 50 mol. % of the monocarboxylic acid and about 50 to 90 mol. % of the polycarboxylic acid based on the total amount of the carboxylic acid in the emulsion, or about 10 to 30 mol. % of the monocarboxylic acid and about 70 to 90 mol. % of the polycarboxylic acid.

The monocarboxylic acid of the monocarboxylic acid or ester or anhydride thereof can comprise, for example, acetic acid, propionic acid, butyric acid, valeric acid, lauric acid, palmitic acid, stearic acid, arachidic acid, or behenic acid, or an unsaturated aliphatic monocarboxylic acid such as oleic acid, linoleic acid, linolenic acid, stearidonic acid, linolelaidic acid, vaccenic acid, elaidic acid, an eicosenoic acid, erucic acid, a mixed fatty acid obtained from a natural fat or oil (e.g., a tall oil fatty acid, a tall oil pitch, a crude tall oil, a soybean oil), or any combination thereof. Preferably, the monocarboxylic acid of the monocarboxylic acid or ester or anhydride thereof comprises a tall oil fatty acid or a $C_{12-20}$ unsaturated fatty acid.

Tall oil refers to the resinous liquid obtained as an acidified byproduct in the Kraft or sulfate processing of pine wood. According to this process, pinewood is digested with alkali and sulfide, producing tall oil soap and crude sulfate turpentine as by-products. Acidification of this soap provides crude tall oil. Crude tall oil, prior to refining, is normally a mixture of rosin acids, fatty acids, sterols, high-molecular weight alcohols, and other alkyl chain materials. Distillation of this crude tall oil is used to recover products such as tall oil pitch, which is a known material of commerce, and is accordingly well known in the art.

The precise composition of a tall oil, crude tall oil, or tall oil pitch will depend, in part, on the process by which it is isolated. Typically, tall oil pitch is the least volatile fraction recovered upon distillation of crude tall oil. Tall oil pitch is a semi-fluid, tar-like material and typically contains approximately 35 to 52% fatty acids and esterified fatty acids, 12-30% rosin acids and 20-35% of neutral materials commonly referred to as "unsaponifiables" which includes higher alcohols and sterols, where these percentages are on a weight basis. Dimerized rosin and dimerized fatty acid are also often found in tall oil pitch. See, e.g., U.S. Pat. Nos. 3,943,117, 4,075,188; 4,154,725; 5,164,480; 5,132,399; 4,524,024; 4,495,095; and 4,238,304 for various processes that provide tall oil pitch. It also is understood by those skilled in the art that because tall oil pitch is derived from natural sources, its composition also varies among the various sources. Tall oil pitch is commercially available from a variety of sources including Georgia-Pacific Chemicals LLC.

The polycarboxylic acid of the polycarboxylic acid or ester or anhydride thereof can be obtained through a dehydration condensation reaction of a dicarboxylic acid derived from vegetable fats and oils. The dicarboxylic acid can comprise, for example, adipic acid, sebacic acid, dodecane diacid, phthalic acid, isophthalic acid, terephthalic acid, succinic acid, an alkenyl succinic acid, or any combination thereof.

The polycarboxylic acid or ester or anhydride thereof can be a polymer obtained by polymerizing a monobasic fatty acid having an unsaturated bond, a polymer obtained by polymerizing an ester of a monobasic fatty acid having an unsaturated bond, a polymer obtained by polymerizing an anhydride of a monobasic fatty acid having an unsaturated bond, or a polymer obtained by polymerizing a triglyceride of a monobasic fatty acid having an unsaturated bond.

The monobasic fatty acid having an unsaturated bond can comprise an unsaturated fatty acid having 1 to 3 unsaturated bonds and having 8 to 24 carbon atoms. Examples of such an unsaturated fatty acid include oleic acid, linoleic acid, linolenic acid, and any combination thereof.

The ester of a monobasic fatty acid having an unsaturated bond can comprise an ester of the monobasic fatty acid having an unsaturated bond as described herein with an aliphatic alcohol, such as an aliphatic alcohol having 1 to 3 carbon atoms.

The polycarboxylic acid or ester or anhydride thereof that is obtained by polymerizing a monobasic fatty acid having an unsaturated bond, or by polymerizing an ester or anhydride of a monobasic fatty acid having an unsaturated bond can contain primarily dimer. For example, the polymerized fatty acid can be obtained by polymerizing 0 to 10 wt. % of a monobasic fatty acid having 18 carbon atoms, 60 to 99 wt. % of a dicarboxylic acid having 36 carbon atoms, and about 0 to 30 wt. % of a tricarboxylic acid having 54 carbon atoms or a polycarboxylic acid.

The acyl halide can comprise, for example, acryloyl halide, methacryloyl halide, crotonoyl halide, fumaryl halide, itaconyl halide, sorbic halide, terephthaloyl halide, or any combination thereof. The halide can comprise chloride, fluoride, bromide, iodide, or any combination thereof.

Anionic emulsifiers include, but are not limited to, sulfonates such as an alpha olefin sulfonate, an internal olefin sulfonate, a paraffin sulfonate, an alkyl benzene sulfonate (e.g., sodium dodecylbenzene sulfonate), an alkyl ether sulfonate, an alkyl sulfonate, an alkyl phenyl ether disulfonate, an alkyl aryl sulfonate, or a sulfonated fatty acid ester; sulfates such as a fatty alcohol sulfate, a fatty alcohol ether sulfate, a sulfated alkylphenol, an alkyl sulfate, or an alkyl ether sulfate; phosphate esters such as a fatty alcohol phosphate monoester, a fatty alcohol phosphate diester, a fatty alcohol ether phosphate monoester, a fatty alcohol ether phosphate diester, an alkyl ether phosphate ester, or an alkyl phosphate ester; carboxylic acid salts such as an alkyl carboxylate, a fatty acid carboxylate, a polyalkoxycarboxylate, an alcohol ether carboxylate, or an alkylphenol ether carboxylate; an ether of a hydroxycarboxylic acid; a sulfosuccinate such as an alkyl sulfosuccinate, a dialkylsulfosuccinate, or a sulfosuccinamate; an alkyl phosphate; or any combination thereof. For example, the anionic emulsifier can comprise an alpha olefin sulfonate.

The solvent can comprise heavy aromatic naphtha, kerosene, benzene, xylene, toluene, pentane, hexane, cyclohexane, methylcyclohexane, heptane, decane, dodecane, diesel, biodiesel, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, cyclohexanone, diisobutylketone, diethyl ether, propylene carbonate, N-methylpyrrolidinone, N,N-dimethylformamide, glycerin, or any combination thereof. For example, the solvent can include heavy aromatic naphtha, kerosene, benzene, xylene, toluene, pentane, hexane, cyclohexane, methylcyclohexane, heptane, decane, dodecane, diesel, biodiesel, or any combination thereof. Preferably, the solvent comprises heavy aromatic naphtha.

The solvent can be a biodiesel derived from a plant-based oil such as a vegetable oil.

Any base is suitable for stabilizing the aqueous base-stabilized emulsion. For example, the base can comprise potassium hydroxide or sodium hydroxide.

The aqueous base-stabilized emulsion can comprise from about 20 to about 60 wt. % of the polyamide, from about 0.1 to about 15 wt. % of the anionic emulsifier, from about 1 to about 25 wt. % of the solvent, from about 0.001 to about 5.0 wt. % of the base, and from about 30 to about 65 wt. % water, based on the total weight of the aqueous base-stabilized emulsion. For example, the aqueous base-stabilized emulsion can comprise from about 30 to about 50 wt. % of the polyamide, from about 0.3 to about 10 wt. % of the anionic emulsifier, from about 3 to about 20 wt. % of the solvent, from about 0.01 to about 3.0 wt. % of the base, and from about 35 to about 60 wt. % water, based on the total weight of the aqueous base-stabilized emulsion. Alternatively, the aqueous base-stabilized emulsion can comprise from about 35 to about 45 wt. % of the polyamide, from about 0.5 to about 5 wt. % of the anionic emulsifier, from about 5 to about 15 wt. % of the solvent, from about 0.1 to about 1.0 wt. % of the base, and from about 40 to about 55 wt. % water, based on the total weight of the aqueous base-stabilized emulsion.

It can be desirable to include a black pigment or dye as a component of the aqueous emulsions of the invention. A black pigment or dye may be added, for example, when the aqueous emulsion is applied to a pavement surface without combining the aqueous emulsion with asphalt to form a priming base before application to the pavement surface. The black pigment can comprise a natural black, a pigment black, or other black pigment such as those identified in the Color Index. Representative black pigments include, but are not limited to, carbon black, aniline black, shungite, lamp black, vine black, bone black, graphite, mars black, cobalt black, manganese black, mineral black, copper chromite black, acetylene black, antimony black, hartshorn black, vantablack, or a combination thereof. The aqueous emulsions of the invention can include from about 0.001 to about 5.00 wt. % of a black pigment or dye, or from about 0.001 to about 2.00 wt. %, or from about 0.001 to about 1.00 wt. %.

A second aspect of the invention is directed to an aqueous acid-stabilized emulsion for use in a priming base material. The aqueous acid-stabilized emulsion can comprise a polyamide; a solvent; a cationic emulsifier; and an acid. The polyamide comprises a condensation reaction product of a carboxylic acid or ester or anhydride thereof or an acyl halide, and an amine.

The carboxylic acid or ester or anhydride thereof or acyl halide and the amine used to form the polyamide of the aqueous acid-stabilized emulsion can be as described above for the aqueous base-stabilized emulsion.

The polyamine used to form the polyamide of the aqueous acid-stabilized emulsion, for example, can comprise a polyethyleneimine, diethylenetriamine, ethylenediamine, triethylenetetramine, tetraethylene pentamine, pentaethylene hexamine, aminoethylpiperazine, or any combination thereof. For example, the polyamine comprises diethylenetriamine, ethylenediamine, triethylenetetramine, a polyethyleneimine, or any combination thereof. Preferably, the polyamine comprises diethylenetriamine.

Cationic emulsifiers include, but are not limited to, quaternary ammonium salts such as a dialkyl dimethyl quaternary ammonium salt (e.g., dicetyldimethyl ammonium chloride, dicocodimethyl ammonium chloride, or distearyldimethyl ammonium chloride); an alkyl trimethyl quaternary ammonium salt (e.g., cocotrimonium chloride, soyatrimonium chloride, stearyltrimonium chloride, or behentrimonium chloride); a polyoxyalkylene-methyl alkyl ether ammonium salt (e.g., polyoxyethylene (2) N-methyl cocoammonium chloride, or polyoxyethylene (2) N-methyl stearylammonium chloride); an ether amine; an alkyl ether amine; a polyoxyalkylene alkyl ether amine (e.g., polyoxyethylene (2) cocoamine, polyoxyethylene (5) tallowamine, or polyoxyethylene (10) cocoamine); an amine oxide (e.g., an alkyl dimethyl amine oxide such as cocodimethylamine oxide), an alkoxylated amine oxide, an alkyl ether dimethyl amine oxide, a polyoxyalkylene alkyl amine oxide such as polyoxyethylene (2) cocoamine oxide, or a polyoxyalkylene alkyl ether amine oxide); a betaine (e.g., an alkyl betaine such as cocobetaine, or an alkyl ether betaine); an alkoxylated amine; an alkoxylated diamine; an alkoxylated poly(hydroxyalkyl)amine; a dialkoxylated amine; a secondary amine; a tertiary amine; a fatty acid amide; an alkoxylated amide; an amidoamine; or any combination thereof.

The cationic emulsifier can comprise a quaternary ammonium salt having the formula:

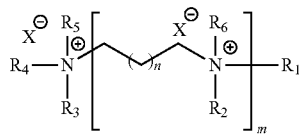

wherein m is 1 or 2; n is 0, 1 or 2; $R_1$ is $C_8$-$C_{30}$ alkyl; $R_2$, $R_3$ and $R_4$ are each independently an alkyl or —$R_5$OH group; $R_5$ and $R_6$ are each hydrogen, methyl or benzyl; and $X^-$ is an anion. For example, m can be 2, n can be 1, $R_1$ can be tallow, $R_2$, $R_3$ and $R_4$ can each be —$CH_2CH_2OH$, $R_5$ and $R_6$ can each be hydrogen, and $X^-$ can be acetate. A typical distribution for tallow can be 3.5% myristic acid, 1.0% myristoleic acid, 0.5% pentadecylic acid, 25.5% palmitic acid, 4.0% palmitoleic acid, 2.5% margaric acid, 19.5% stearic acid, 41.0% oleic acid, 2.5% linoleic acid, and 0.5% arachidic acid.

The term "alkyl," as used herein, unless otherwise specified, refers to a linear or branched hydrocarbon group, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl.

The anion can be any anion used in the emulsifier art such as, for example, chloride, bromide, iodide, sulfate, ethosulfate, phosphate, acetate, propionate, succinate, lactate, citrate or tartrate.

The solvent of the aqueous acid-stabilized emulsion can be as described above for the aqueous base-stabilized emulsion.

Any acid may be suitable for stabilizing the aqueous acid-stabilized emulsion. For example, the acid can comprise acetic acid, formic acid, benzoic acid, oxalic acid, hydrochloric acid, sulfuric acid, phosphoric acid, nitric acid, perchloric acid, hydrofluoric acid, hydrobromic acid, or a salt or any combination thereof.

The aqueous acid-stabilized emulsion can comprise from about 20 to about 50 wt. % of the polyamide, from about 0.1 to about 15 wt. % of the cationic emulsifier, from about 1 to about 30 wt. % of the solvent, from about 0.0001 to about 1 wt. % of the acid, and from about 30 to about 65 wt. % water, based on the total weight of the aqueous acid-stabilized emulsion. For example, the aqueous acid-stabilized emulsion can comprise from about 25 to about 45 wt. % of the polyamide, from about 0.1 to about 10 wt. % of the cationic emulsifier, from about 3 to about 25 wt. % of the solvent, from about 0.0001 to about 0.1 wt. % of the acid, and from about 35 to about 60 wt. % water, based on the total weight of the aqueous acid-stabilized emulsion. Alternatively, the aqueous acid-stabilized emulsion can comprise from about 30 to about 45 wt. % of the polyamide, from about 0.5 to about 5 wt. % of the cationic emulsifier, from about 5 to about 20 wt. % of the solvent, from about 0.0001 to about 0.01 wt. % of the acid, and from about 40 to about 55 wt. % water, based on the total weight of the aqueous acid-stabilized emulsion.

The black pigment or dye of the aqueous acid-stabilized emulsion can be as described above for the aqueous base-stabilized emulsion.

Representative compositions for preparing an aqueous base-stabilized or acid-stabilized emulsion of the invention are provided in Table 1 below.

TABLE 1

| | Compositions for Preparing an Aqueous Emulsion | | | | | | | | |
|---|---|---|---|---|---|---|---|---|---|
| | A | B | C | D | E | F | G | H | I |
| Component | Amount (wt. %) | | | | | | | | |
| Polyamide | | | | | | | | | |
| C18-unsaturated, fatty acids, dimers, polymers with diethylenetriamine and tall-oil fatty acids (CAS# 68139-75-3) | | 32.5 | 37.5 | 50.0 | | | | | |
| Tall oil pitch, reaction products with polyethyleneimine | | | | | | | | | 60.0 |
| Tall oil fatty acids, reaction products with ethylenediamine-ethylenimine polymer (CAS#1624317-89-0) | 20.0 | | | | | | | 39.6 | 44.5 |
| Oleic acid, reaction products with diethylenetriamine | | | | | | 20.0 | | | |
| Soybean oil, reaction products with triethylenetetramine | | | | | | | 34.5 | | |

TABLE 1-continued

Compositions for Preparing an Aqueous Emulsion

| Component | A | B | C | D | E | F | G | H | I |
|---|---|---|---|---|---|---|---|---|---|
| | | | | Amount (wt. %) | | | | | |
| Emulsifier | | | | | | | | | |
| Alpha olefin sulfonate | | | | | 13.5 | | 2.0 | | 0.3 |
| Alkyl benzene sulfonate | | | | | | 3.2 | | 7.5 | |
| Amines, N-tallow alkyldipropylene, ethoxylated acetate | | 5.0 | 1.3 | | | | | | |
| Dicocodimethyl ammonium chloride | 15.0 | | | 0.5 | | | | | |
| Solvent | | | | | | | | | |
| Heavy aromatic naphtha | | | 12.5 | | 25.0 | | 10.4 | | |
| Biodiesel | 30.0 | 5.5 | | | | 15.2 | | 7.6 | |
| Kerosene | | | | 1.0 | | | | | 3.0 |
| Base | | | | | | | | | |
| Potassium hydroxide (45% aqueous) | | | | | 1.0 | 0.75 | 0.56 | 0.32 | 0.1 |
| Acid | | | | | | | | | |
| Acetic acid, potassium salt | 0.1 | 0.05 | 0.002 | 0.0001 | | | | | |
| Water | 32.9 | 56.95 | 48.0 | 47.5 | 40.5 | 46.35 | 47.44 | 35.08 | 36.6 |
| Black Pigment or Dye | | | | | | | | | |
| Carbon black | 2.0 | | | | | | | 5.0 | |
| Shungite | | | | 1.0 | | | | | |

A third aspect of the invention is directed to an aqueous priming base emulsion for use on a pavement surface. The aqueous priming base emulsion can comprise asphalt and either of the aqueous base-stabilized emulsion or the aqueous acid-stabilized emulsion.

The asphalt can be any bitumen product derived from crude oil, especially those ordinarily used in paving roads.

The asphalt can comprise straight asphalt, semi-blown asphalt, blown asphalt, polymer-modified asphalt, cutback asphalt, petroleum-based asphalt, tar, coal tar, bitumen, or a combination thereof.

The aqueous priming base emulsion can comprise from about 3 to about 15 wt. % of the aqueous base-stabilized emulsion or the aqueous acid-stabilized emulsion, from about 3 to about 15 wt. % of the asphalt, and from about 70 to about 94 wt. % water, based on the total weight of the aqueous priming base emulsion. For example, the aqueous priming base emulsion can comprise from about 3 to about 12 wt. % of the aqueous base-stabilized emulsion or the aqueous acid-stabilized emulsion, from about 3 to about 12 wt. % of the asphalt, and from about 76 to about 94 wt. % water, based on the total weight of the aqueous priming base emulsion. Alternatively, the aqueous priming base emulsion can comprise from about 6 to about 9 wt. % of the aqueous base-stabilized emulsion or the aqueous acid-stabilized emulsion, from about 6 to about 9 wt. % of the asphalt, and from about 82 to about 88 wt. % water, based on the total weight of the aqueous priming base emulsion.

Any of the emulsions of the invention can be prepared as concentrates wherein the amount of water in the emulsion is decreased and the concentrate is later diluted to form a ready-to-use emulsion.

Other additives commonly used in the paving industry can be added to the emulsions of the invention including thickeners, pH adjusters, modifiers, and other typical asphalt and emulsion additives, such as water softeners, adhesion promoters, breaking agents such as aluminum sulfate, peptizers, polymers, among other additives well-known in the art. Softeners, include flux, re-refined engine oil bottom (REOB), anti-strip agents, warm mix additives, vacuum tower asphalt extender (VTAE), petroleum extract, or other known compounds to make a less viscous product, improve lubricity in a mixture, and/or reduce temperature requirements. Hardeners, plastomers, and elastomers, include ethylene vinyl acetate (EVA), vinyl acetate-ethylene (VAE), styrene-butadiene-styrene (SBS), styrene butadiene (SB), styrene-butadiene rubber (SBR), SBR Latex, polychloroprene, isoprene, polybutadiene, acrylic, acrylic copolymers, ground tire rubber (GTR), crumb rubber modifier (CRM), terpolymers, polyphosphoric acid (PPA), natural or synthetic waxes, GILSONITE (also known as uintaite), Trinidad Lake asphalt, and other modifiers that are well-known in the industry and commonly used for the purpose of adding elastomeric properties and strength. Emulsion additives include stabilizers, thickeners, additives known to adjust pH, water softeners, breaking agents, peptizers, and adhesion promoters. The amount of conventional asphalt priming base additive(s) used may be any amount that is typically used for modifying asphalt priming bases for a given application and/or asphalt product. These amounts are well-known in the field. Thus, a person of skill in the art would be able to determine what conventional additive(s) and what amount(s) is/are desirable or required to meet a given application condition or contract requirement for the emulsions and priming bases.

The aqueous base- or acid-stabilized emulsions and the aqueous priming base emulsion can be prepared by conventional means well known in the paving art. For example, the emulsions can be prepared in a colloid mill. The components of these compositions can be mixed in any order of addition in the desired proportions in a vessel with stirring and maintained at temperatures up to about 93° C. Any solid components can be heated and liquefied prior to being charged to the vessel.

A fourth aspect of the invention is a method of priming a pavement surface. The method can comprise applying the aqueous base-stabilized emulsion, the aqueous acid-stabilized emulsion, or the aqueous priming base emulsion to a pavement surface to form a primed pavement surface; and curing the primed pavement surface.

The method can further include preparing the aqueous priming base emulsion on site by mixing the aqueous base-stabilized emulsion or the aqueous acid-stabilized emulsion with the asphalt and water before application of the aqueous priming base emulsion to the pavement surface.

The method can include preparing a dilute, ready-to-use aqueous base- or acid-stabilized emulsion from a concentrate of the aqueous base- or acid-stabilized emulsion by diluting the concentrate with water.

The ratio of concentrate to added water in the ready-to-use emulsion can be from about 1:1 to about 1:15 parts by weight, or from about 1:3 to about 1:12 parts by weight, or from about 1:6 to about 1:10 parts by weight. The ratio selected for a particular application will depend on factors such as the composition of the pavement to which it is applied, the number of applications, and the desired cure time.

The emulsions can be applied at conventional application rates using conventional equipment known in the paving and priming art such as spraying equipment.

The pavement can comprise a granular base. For example, the granular base can comprise caliche, gravel, sand, clay, silt, or combinations thereof. The emulsions of the invention are effective in providing sufficient penetration of the more difficult bases, substrates and aggregates encountered in the industry.

The emulsions of the invention produce a tough, durable surface coating that cures very rapidly in about 3 to about 24 hours, and resists cracking and separation from the base course. The cured surface is also resistant to damage by vehicle tires and therefore does not require post-application covers of sand or other materials to protect the surface from traffic. The emulsions of the invention do not require the use of heated application appliances or maintenance at elevated temperatures during treatment of the base course.

After an emulsion of the invention is used to produce a surface coating, a pavement material may be applied to the surface coating to complete the roadway or other pavement. The pavement material can include one or more layers of an asphalt pavement or a Portland cement pavement, such as a hot-mix asphalt, asphalt cement and aggregate, or concrete.

Having described the invention in detail, it will be apparent that modifications and variations are possible without departing from the scope of the invention defined in the appended claims.

EXAMPLES

The following non-limiting examples are provided to further illustrate the invention.

Samples of Emulsion C of the invention (prepared as in Table 1 above), diluted at a ratio of Emulsion C to water of 1:1 to 1:10 parts by weight, and of comparative products were tested using the Sand Penetration Test for Priming Materials (Bulletin 25—Appendix B of Pennsylvania DOT (PennDOT) Specifications for Bituminous Materials) to evaluate how well a priming product penetrates standard siliceous sand as compared to the penetration of a PennDOT comparative product known as MC-30 Cutback Asphalt. Emulsions of the invention were also compared to a conventional asphalt emulsion priming base diluted 1:1 parts by weight with water and including 10% of a wetting agent as reported in Table 2 as "Comparative Asphalt Emulsion."

Screened silica sand #20326 (from AGSCO, Wheeling, Ill.) was mixed with 5.0% water at 24 hours prior to testing. The moistened sand was placed into a container (minimum thickness of material being 38 mm) and compacted at 7 kg/cm$^2$ using a round metal disc or plunger slightly smaller in diameter than the container. Using the specified dilution ratio in Table 2, 5 grams of a priming product was weighed into the container of compacted sand. For comparison purposes, the material is poured from a height of 4 inches into the center of the container allowing it to flow from the point of pouring itself.

Penetration time (in seconds) was measured from the time that the priming product made contact with the sand until the product has penetrated the compacted sand, and is reported in Table 2.

A cross-sectional area of the penetrated sand was removed with a spatula, and the average depth of penetration was measured in mm and reported in Table 2 as penetration depth. The penetration time and depth of emulsions of the invention were compared to the reference siliceous sand (MC-30 cutback). A product was considered passing if it penetrated as fast and as deep as the MC-30 reference material. Material with a shiny appearance, a "skin" or that pools or puddles on the surface was considered a failing result.

After the sand penetration test was completed, the container containing the treated sand was placed in an oven at 60° C. for 24 hours, after which time a suitable priming product exhibited cohesiveness and was not friable. Material was considered cohesive if when the material was squeezed in hand it stayed in one piece or did not crumble easily.

TABLE 2

| Sample Description | Sample Concentration (wt. %) | Sample Weight (g) | Penetration Time (s) | Penetration Depth (mm) |
| --- | --- | --- | --- | --- |
| MC-30 Cutback Asphalt Test #1 | 100 | 5.02 | 607 | 16 |
| MC-30 Cutback Asphalt Test #2 | 100 | 4.99 | 526 | 16 |
| MC-30 Cutback Asphalt Test #3 | 100 | 5.03 | 452 | 17 |
| MC-30 Cutback Asphalt Average | 100 | — | 528 | 16 |
| Comparative Asphalt Emulsion, 1:1 Test #1 | 50 | 5.01 | >900 | 5 |
| Comparative Asphalt Emulsion, 1:1 Test #2 | 50 | 5.05 | >900 | 5 |
| Comparative Asphalt Emulsion, 1:1 Test #3 | 50 | 5.11 | >900 | 4.5 |
| Comparative Asphalt Emulsion, 1:1 Average | 50 | — | >900 | 5 |
| Emulsion C, Diluted 1:1 w/H20 Test #1 | 50 | 5.09 | 39 | 9 |
| Emulsion C, Diluted 1:1 w/H20 Test #2 | 50 | 4.97 | 29 | 8 |
| Emulsion C, Diluted 1:1 w/H20 Test #3 | 50 | 5.17 | 34 | 7 |

TABLE 2-continued

| Sample Description | Sample Concentration (wt. %) | Sample Weight (g) | Penetration Time (s) | Penetration Depth (mm) |
|---|---|---|---|---|
| Emulsion C, Diluted 1:1 w/H20 Average | 50 | — | 34 | 8 |
| Emulsion C, Diluted 1:2 w/H20 Test #1 | 33.3 | 5.03 | 19 | 10 |
| Emulsion C, Diluted 1:2 w/H20 Test #2 | 33.3 | 4.96 | 16 | 9 |
| Emulsion C, Diluted 1:2 w/H20 Test #3 | 33.3 | 4.99 | 14 | 9 |
| Emulsion C, Diluted 1:2 w/H20 Average | 33.3 | — | 16 | 9 |
| Emulsion C, Diluted 1:3 w/H20 Test #1 | 25 | 5.01 | 16 | 10 |
| Emulsion C, Diluted 1:3 w/H20 Test #2 | 25 | 5.21 | 14 | 10 |
| Emulsion C, Diluted 1:3 w/H20 Test #3 | 25 | 5.02 | 14 | 10 |
| Emulsion C, Diluted 1:3 w/H20 Average | 25 | — | 15 | 10 |
| Emulsion C, Diluted 1:6 w/H20 Test #1 | 14.3 | 5.11 | 17 | 8 |
| Emulsion C, Diluted 1:6 w/H20 Test #2 | 14.3 | 5.10 | 18 | 8 |
| Emulsion C, Diluted 1:6 w/H20 Test #3 | 14.3 | 10.06 | 37 | 9 |
| Emulsion C, Diluted 1:6 w/H20 Test #4 | 14.3 | 15.16 | 93 | 12 |
| Emulsion C, Diluted 1:6 w/H20 Test #5 | 14.3 | 20.18 | 124 | 14 |
| Emulsion C, Diluted 1:7 w/H20 Test #1 | 12.5 | 6.05 | 18 | 8 |
| Emulsion C, Diluted 1:7 w/H20 Test #2 | 12.5 | 5.02 | 17 | 8 |
| Emulsion C, Diluted 1:8 w/H20 Test #1 | 11.1 | 5.07 | 18 | 7 |
| Emulsion C, Diluted 1:9 w/H20 Test #1 | 10.0 | 5.06 | 16 | 6 |
| Emulsion C, Diluted 1:10 w/H20 Test #1 | 9.1 | 5.05 | 16 | 6 |

Penetration time for the Emulsion C products were significantly less than those of the comparative products, and penetration depths were acceptable. All of the samples tested has surfaces that were sufficiently hydrophobic after curing except for the Emulsion C, 1:10 dilution.

Aqueous asphalt emulsions of the invention was also prepared from Emulsion C and asphalt. For example, a "20% Formulation" of Table 3 includes 20% of Emulsion C and 80% asphalt. All asphalt emulsions were diluted in a 1:6 weight ratio of Emulsion C to water. These asphalt emulsions were tested in the same manner as described above.

TABLE 3

| Sample Description | Sample Concentration (wt. %) | Sample Weight (g) | Penetration Time (s) | Penetration Depth (mm) |
|---|---|---|---|---|
| Asphalt Emulsion, 0% Formulation | 0 | 5.07 | >900 | 0 |
| Asphalt Emulsion, 20% Formulation | 2.9 | 5.02 | >900 | 2 |
| Asphalt Emulsion, 40% Formulation | 5.7 | 5.16 | >900 | 2 |
| Asphalt Emulsion, 60% Formulation | 8.6 | 5.02 | >900 | 2 |
| Asphalt Emulsion, 75% Formulation | 10.7 | 5.02 | >900 | 2 |
| Asphalt Emulsion, 80% Formulation | 11.4 | 5.02 | 408 | 4 |
| Asphalt Emulsion, 85% Formulation | 12.1 | 5.00 | 426 | 4 |
| Asphalt Emulsion, 90% Formulation | 12.9 | 5.01 | 34 | 5 |
| Asphalt Emulsion, 95% Formulation | 13.6 | 5.20 | 18 | 6 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. An aqueous base-stabilized emulsion for use in a priming base material, the aqueous base-stabilized emulsion comprising:

from about 20 wt. % to about 60 wt. % of a polyamide;
from about 0.1 wt. % to about 15 wt. % of an anionic emulsifier;
from about 1 wt. % to about 25 wt. % of a solvent; and
from about 0.001 wt. % to about 5 wt. % of a base; and
from about 30 to about 65 wt. % water,
wherein the polyamide comprises a condensation reaction product of an amine and a carboxylic acid or an ester or anhydride thereof or an acyl halide; based on the total weight of the aqueous base-stabilized emulsion.

2. The aqueous base-stabilized emulsion of claim 1, wherein the amine comprises a polyamine, an amino carboxylic acid, an amino alcohol, or any combination thereof.

3. The aqueous base-stabilized emulsion of claim 1, wherein the amine comprises a polyethyleneimine, diethylenetriamine, ethylenediamine, triethylenetetramine, tetraethylene pentamine, pentaethylene hexamine, aminoethylpiperazine, or any combination thereof.

4. The aqueous base-stabilized emulsion of claim 3, wherein the amine comprises the polyethyleneimine.

5. The aqueous base-stabilized emulsion of claim 4, wherein the polyethyleneimine comprises an ethylenediamine-ethyleneimine polymer.

6. The aqueous base-stabilized emulsion of claim 1, wherein the anionic emulsifier comprises an alpha olefin sulfonate, an alkyl benzene sulfonate, an alkyl ether sulfonate, an alkyl sulfonate, an alkyl phenyl ether disulfonate, an alkyl aryl sulfonate, a sulfonated fatty acid ester, a fatty alcohol sulfate, a fatty alcohol ether sulfate, a sulfated alkylphenol, an alkyl sulfate, an alkyl ether sulfate, a fatty alcohol phosphate monoester, a fatty alcohol phosphate diester, a fatty alcohol ether phosphate monoester, a fatty alcohol ether phosphate diester, an alkyl phosphate ester, a carboxylic acid salt, an ether of a hydroxycarboxylic acid, a sulfosuccinate, an alkyl sulfosuccinate, a sulfosuccinamate, an alkyl phosphate, or any combination thereof.

7. The aqueous base-stabilized emulsion of claim 6, wherein the anionic emulsifier comprises an alpha olefin sulfonate.

8. The aqueous base-stabilized emulsion of claim 1, wherein the base comprises potassium hydroxide or sodium hydroxide.

9. The aqueous base-stabilized emulsion of claim 1, wherein the aqueous base-stabilized emulsion comprises from about 30 to about 50 wt. % of the polyamide, from about 0.3 to about 10 wt. % of the anionic emulsifier, from about 3 to about 20 wt. % of the solvent, from about 0.01 to about 3.0 wt. % of the base, and from about 35 to about 60 wt. % water, based on the total weight of the aqueous base-stabilized emulsion.

10. The aqueous base-stabilized emulsion of claim 1, wherein the aqueous base-stabilized emulsion comprises from about 35 to about 45 wt. % of the polyamide, from about 0.5 to about 5 wt. % of the anionic emulsifier, from about 5 to about 15 wt. % of the solvent, from about 0.1 to about 1.0 wt. % of the base, and from about 40 to about 55 wt. % water, based on the total weight of the aqueous base-stabilized emulsion.

11. The aqueous base-stabilized emulsion of claim 1, further comprising a black pigment or dye.

12. The aqueous base-stabilized emulsion of claim 11, wherein the black pigment or dye comprises carbon black, aniline black, shungite, lamp black, vine black, bone black, graphite, mars black, cobalt black, manganese black, mineral black, copper chromite black, acetylene black, antimony black, hartshorn black, vantablack, or any combination thereof.

13. The aqueous base-stabilized emulsion of claim 1, wherein the carboxylic acid of the carboxylic acid or ester or anhydride thereof comprises a tall oil fatty acid, a tall oil pitch, a crude tall oil, a soybean oil, oleic acid, linoleic acid, linolenic acid, stearidonic acid, linolelaidic acid, vaccenic acid, elaidic acid, or any combination thereof.

14. The aqueous base-stabilized emulsion of claim 1, wherein the solvent comprises heavy aromatic naphtha, kerosene, benzene, xylene, toluene, pentane, hexane, cyclohexane, methylcyclohexane, heptane, decane, dodecane, diesel, biodiesel, or any combination thereof.

15. A method of priming a pavement surface, the method comprising:
applying the aqueous base-stabilized emulsion of claim 1 to a pavement surface to form a primed pavement surface; and curing the primed pavement surface.

* * * * *